United States Patent [19]
Rosenthal et al.

[11] Patent Number: 4,897,235
[45] Date of Patent: Jan. 30, 1990

[54] PROCESS FOR IMPARTING A SURFACE COATING TO FILMS

[75] Inventors: Heinrich Rosenthal; Ingo Schinkel, both of Walsrode, Fed. Rep. of Germany

[73] Assignee: Wolff Walsrode Aktiengesellschaft, Walsrode, Fed. Rep. of Germany

[21] Appl. No.: 203,979

[22] Filed: Jun. 8, 1988

Related U.S. Application Data

[63] Continuation-in-part of Ser. No. 942,103, Dec. 16, 1986, abandoned.

[30] Foreign Application Priority Data

Dec. 21, 1985 [DE] Fed. Rep. of Germany ....... 3545591

[51] Int. Cl.[4] ........................................ B29C 47/02

[52] U.S. Cl. ............................ 264/134; 264/40.1; 264/171; 264/288.4; 427/172; 427/211

[58] Field of Search .................. 264/289.3, 134, 171, 264/40.1, 288.4; 427/172, 173, 211

[56] References Cited

U.S. PATENT DOCUMENTS

| | | | |
|---|---|---|---|
| 3,285,766 | 11/1966 | Barkis et al. . | |
| 3,751,281 | 8/1973 | Peterson et al. | 264/134 |
| 4,225,644 | 9/1980 | Tsuchiya et al. | 264/134 |
| 4,248,576 | 2/1981 | Birks et al. | 427/173 |
| 4,493,857 | 1/1985 | Knigge et al. | 427/96 |

FOREIGN PATENT DOCUMENTS

| | | | |
|---|---|---|---|
| 57-6724 | 1/1982 | Japan | 264/289.3 |

*Primary Examiner*—James Lowe
*Attorney, Agent, or Firm*—Sprung Horn Kramer & Woods

[57] ABSTRACT

Process for the production of surface-finished, at least monoaxially stretched, thermoplastic films which are characterized in that the surface coating is imparted by means of slot doctoring systems before at least one stretching stage, and the subsequent stretching is carried out without contact with the surface.

4 Claims, 1 Drawing Sheet

PROCESS FOR IMPARTING A SURFACE COATING TO FILMS

Figure 1:
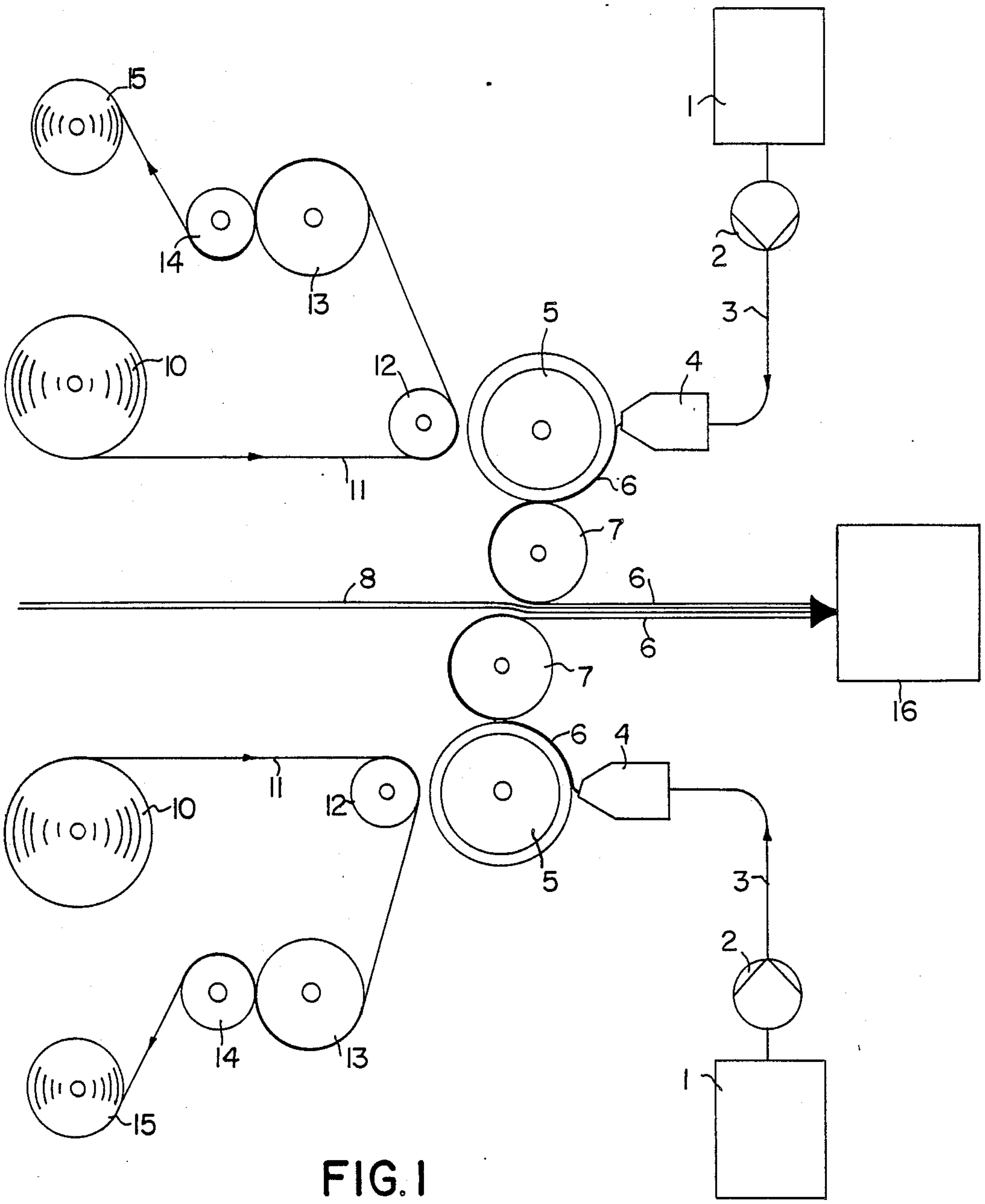

This is a continuation-in-part of Application Ser. No. 942,103, filed Dec. 16, 1986, now abandoned.

The invention relates to a process for the production of surface-coated, at least monoaxially stretched, thermoplastic films, in which the surface coating is imparted by means of a slot doctoring system before at least one stretching stage, and the subsequent stretching is carried out without contact with the surface.

The slot doctoring system is already known as a coating process for the production of, for example, adhesive tapes, insulating tapes or adhesive labels. In this process, so-called hot-melts or thermoplastic adhesives are applied to a finished base film, that is to say a film in a condition identical with that in the end product ready for use. The disadvantage of a procedure of this type is the separate coating process, moreover it is necessary to unwind the finished film, coat it on one side, cool it after coating and wind it up again.

Surprisingly, it is now possible, by means of the process according to the invention, to coat not merely one surface but both surfaces of a film and, additionally, to carry this out simultaneously, without a separate operation, that is to say during the production of the base film and, in addition, also to achieve better adhesion between the surface coating and the base film as a result of the subsequent joint stretching in at least one direction.

The present invention therefore relates to a process for the production of surface-coated, at least monoaxially stretched, thermoplastic films which are characterized in that the surface coating is imparted by means of slot doctoring systems before at least one stretching stage, and the subsequent stretching is carried out without contact with the surface.

The process is particularly suitable for the production of surface-coated, stretched, thermoplastic polyolefine films, polyester films or polyamide films. The process according to the invention is very particularly suitable for applying the surface coating to films based on propylene polymers which are subsequently stretched in at least one direction, preferably stretched biaxially. In particular, the procedure according to the invention can be used for the production of films of this type which are also sealable, it being preferable to apply the sealing layers by the process according to the invention.

The process according to the invention also offers the advantages that, as a result of the stretching carried out after the surface coating has been imparted:

an evening out of the layers of material applied takes place it is possible to produce extremely thin layers (for example primer layers), such as cannot be achieved by separate coating and if the subsequent stretching is carried out transversely to the direction of operating of the machine, the coating only has to be carried out over a relatively narrow surface, that is to say the original width of the unstretched film.

Coatings suitable for application by means of a slot doctoring system are hot-melts, waxes, polymers or mixtures of these substances having melt viscosities of up to 200,000 mPa.s or release agents, such as, for example, polydiorganosiloxanes, it being necessary that these materials should have a melt viscosity at the processing temperature of at least 2000 mPa.s, preferably 5000 to 100,000 mPa.s, as specified in DIN 53,019. If the materials to be applied are not liquid at 25° C., they are applied from the melt. It is also possible to apply, by the process according to the invention, sensitive or heat-sealable adhesive materials which are in themselves known, such as are used for the production of adhesive tapes.

Sealable materials and/or adhesion promoters which can be applied particularly preferably by the process according to the invention are those which cannot be applied by customary procedures, such as Lamination or co-extrusion, in the production of stretched, sealable multi-layer films because their viscosity is too low, they have an unsuitable flow behaviour and/or cannot form self-supporting films. Preferably, these are adhesion promoters based on modified polyolefines, such as olefinic (co)polymers, grafted and/or blended with polyolefines, or copolymers formed from $\alpha$-olefines, such as ethylene and other $\alpha,\beta$-unsaturated monomers. Ethylene/vinyl acetate copolymers or polyethyleneimines may be mentioned as examples. Sealing materials which can be applied by the process according to the invention are acrylate copolymers, preferably copolymers formed from methyl methacrylate, methyl acrylate and methacrylic acid.

It is also possible to apply, by the process according to the invention, thermoplastic adhesives based on polyvinyl acetate, copolyamides, copolyesters, polyurethanes or styrene/butadiene copoloymers.

The process according to the invention makes it possible, not only to impart a continuous surface coating over the whole surface, but also to apply a strip-shaped, dot-shaped and/or intermittent finish. It is furthermore possible to carry out multi-layer applications of different substances using several slot doctoring systems operating one behind another.

The known slot doctoring system consists essentially of an application head (slot die), at least one silicone-coated applicator roll and a conveying device and, if appropriate, a melting device.

The procedure according to the invention is shown diagrammatically in FIG. 1.

In accordance with FIG. 1, the materials to be applied are, if necessary, melted in a stock and, if necessary, melting, vessel (1) and are conveyed via a pump (2) through a tubing (3), which is, if necessary, heated with oil, to the application head (slot die) (4), which is arranged to that it can be moved horizontally in front of an appicator roll (5), whereby it is possible to adjust the distance between the application head (4) and the applicator roll (5) in such a way that the material to be applied can be transferred from the application head (4) direct to the surface of the applicator roll (5). A continuous film, the thickness of which can be controlled by the peripheral speed of the applicator roll (5) and the delivery pressure of the material to be applied from the application head (4), is thus formed on the surface of the applicator roll. The applicator roll (5), which preferably has a silicone coating, is brought into contact with a transfer and laminating roll (7) which, in turn, transfers the surface film to a film (8) which passes through and is optionally stretched in the direction of operation of the machine. The other surface of the continuous film (8) can also be coated, as shown in FIG. 1, by means of an identical device (slot doctoring system). The film (8), to which a surface coating has been applied on both sides in this manner, is preferably stretched transversely in a known manner in a subsequent stretching process without surface contact (16), whereby the initial thickness of the individual layers of the multi-layer film thus produced are reduced in accordance with the stretching ratio.

As also shown in FIG. 1, the application head (4) and the applicator roll (5) are detached and moved away from the transfer and laminating roll (7), and the latter in turn from the film (8) passing through, in order to adjust the surface coating so that it conforms to the desired value and is uniform over the width of the material. By means of a change-over mechanism, the contact roll (12) of a supporting film or paper guide system is swung against the applicator roll (5), and takes off the applied layer (6) on a paper or supporting film web (11) which is drawn off from the reel (10), and carries this applied layer over a cooling roll (13) and a deflection roll (14) to a wind-up station (15). Samples can thus be withdrawn and monitored and, if necessary alterations in the adjustment can be carried out while the production process is running without interfering with the latter.

The invention is particularly applicable to films of propylene polymers which films have been stretched by about 3 to 20 times their original dimension, to impart strength and toughness.

It will be understood that the specification and examples are illustrative but not limitative of the present invention and that other embodiments within the spirit and scope of the invention will suggest themselves to those skilled in the art.

What is claimed is:

1. A process for the production of a surface-coated thermoplastic film of propylene polymer, which comprises applying to the film a melt of the desired coating, and then stretching the film at least monoaxially about 3 to 20 fold without contacting the film surface during stretching, said process carried out by a slot doctoring system comprising a transfer and laminating roll, an application head, at least one applicator roll and a melting device whereby the coating material to be applied is transferred directly from the application head to the surface of the applicator roll, which is brought into contact with the transfer and laminating roll which, in turn, transfers the melt to a film and wherein by means of a change-over mechanism a contact roll of a supporting film or paper guide system can be swung against the applicator roll to take off an applied layer over a cooling roll and a deflection roll to a wind-up station from which samples can be withdrawn and monitored.

2. A process according to claim 1, wherein the surface coating is a sealing layer.

3. A process according to claim 1, wherein the surface coating comprises at last one of a hot-melt, wax or polymer having a melt viscosity of up to 200,000 mPa.

4. A process according to claim 1, wherein the surface coating comprises an adhesion promoter based on a modified polyolefin.

* * * * *